INVENTOR.
WALTER T. BULSON

United States Patent Office 3,090,699
Patented May 21, 1963

3,090,699
SAG-RESISTANT FIBERBOARD AND METHOD OF MAKING SAME
Walter T. Bulson, East Hempfield Township, Lancaster County, Pa., assignor to Armstrong Cork Company, Lancaster, Pa., a corporation of Pennsylvania
Filed May 12, 1960, Ser. No. 28,547
7 Claims. (Cl. 117—62.2)

This invention relates generally to fiberboard and more particularly to an acoustical fiberboard or unit. Still more particularly the invention relates to the production of a sag-resistant fiberboard containing, preferably, mineral wool fibers.

Conditions of high humidity, particularly in conjunction with a suspended ceiling, frequently bring about changes in the amylaceous binder of certain fiberboards. The amylaceous binder softens, and the units may, and often do, sag of their own weight. An unsightly appearance of the ceiling surface results. Suspended ceilings are those in which the units are supported by mechanical fasteners such as T runners and splines received within saw kerfs provided in the edges of the units. The units, particularly in the form of acoustical tile, generally measure 12" x 12", but in recent years larger units have been installed. It is apparent that the larger the unit, the greater the sagging problem under conditions of high humidity. Acoustical ceilings in particular are being installed more and more frequently in a wider variety of applications; the so-called "sound conditioning" of homes, offices, factories, and other regions of human activity have subjected acoustical ceilings to conditions of high humidity which were infrequently encountered in the past. Sagging of these ceilings has become a major problem. Building specifications frequently require that acoustical, fiberboard ceilings not be installed in the presence of fresh concrete, or prior to the installation of the doors and windows, in order to minimize the effects of moist air on the ceiling.

Sagproofing compositions such as waxes and resins have not proved feasible. They interfere with sound absorption, or are too expensive, or are otherwise objectionable.

It is the primary object of the present invention to present a substantially sagproof fiberboard comprising board-making fibers and an amylaceous binder. It is a further object of the present invention to present a simple and straightforward process for sagproofing fiberboards having an amylaceous binder.

These objects are accomplished in a surprisingly effective manner. A fiberboard containing a gelled amylaceous binder is treated with formaldehyde gas until the board no longer gives the characteristic purple color on being tested with starch-indicating iodine solution.

Figure 1:
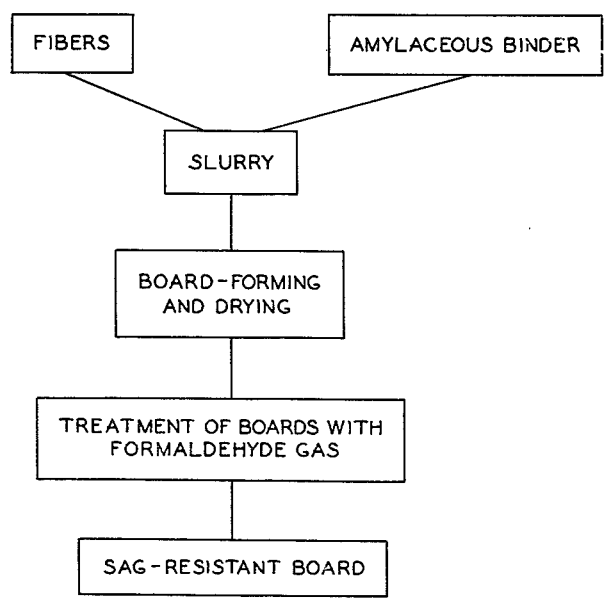
Figure 2:
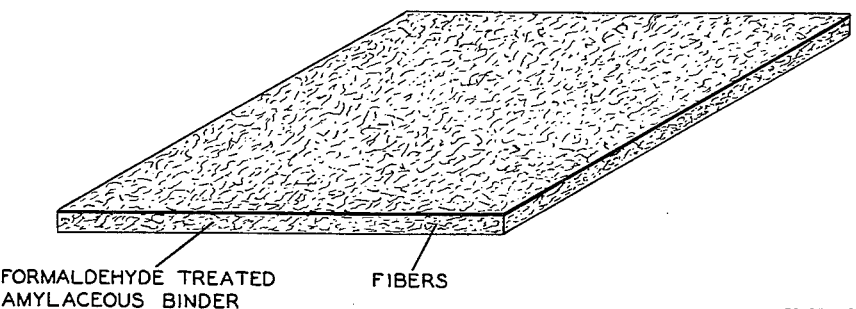

In the drawings:
FIG. 1 is a flow sheet representing a method according to the present invention; and
FIG. 2 is a simplified perspective view of a fiberboard according to the present invention.

The fiberboards are prepared in known manner. The board-making fibers are preferably mineral wool, but they may be glass fibers or the like, or cellulosic fibers such as wood, bagasse, and other materials. Asbestos may be used. A slurry is prepared by taking up the fibers in water, and an amylaceous binder system, fillers and a waterproofing sizing material are added. The amylaceous binder will be a starch such as pearl, tapioca, wheat flower, sweet potato, or any convenient starch; economics will generally control the selection of the particular starch. The amount of starch will generally be about 0.5%–25% by weight based on the total ingredients of the board. If cellulosic fibers are used to form the board, smaller amounts of starch will produce the requisite strength of the finished board, 10% by weight of the total ingredients being about a maximum normally used, and 4½% by weight being a preferred maximum. With the preferred mineral wool, larger amounts of starch are generally needed, up to the 25% by weight maximum, but preferably in the range of about 5–18% by weight. The starch is taken up in water, and a portion of the starch slurry may be gelled by heating, depending on the binding action required. The higher the content of gelled starch at this point in the process, the stronger the ultimate product. But an increase in the amount of gelled starch also increases the drainage time of a slurry to be drained on a forming wire between deckle straps. If the slurry is to be thick and stiff, as is the case when the boards are formed by trowelling the stiff slurry into a mold, no concern need be felt about the drainage characteristics of the slurry, and all the starch may be gelled.

Known fillers are to be added to the slurry. These may be the clays and earths, calcium carbonate or whiting, gypsum, or magnesium oxide. Some wood fiber fiberboards may contain no filler at all, except possibly sawdust or some equivalent material. Fillers generally harden the inorganic fiber fiberboards, and are more frequently used there than with cellulosic boards. The amount of fillers will generally run from 0–25% by weight of the total ingredients. If ground scrap is recycled as filler, then the total amount added as filler may run as high as 40% by weight of total ingredients.

Any size to be added will be used in a relatively small amount, generally about 0.25–3% by weight of the total ingredients, and preferably about 1% by weight. The particular size will be chosen in view of the particular board. Examples of the sizes are the petroleum hydrocarbon waxes, resin-modified waxes, and rosin-wax mixtures. These are added to the slurry in the form of an emulsion. Minor ingredients such as preservatives, for example the pentachlorophenates, may be added. Relatively small amounts of boric acid may be added to inhibit smouldering in the event of excess heat or fire.

If the board is to be formed on a wire, the water is withdrawn from the mat in the usual manner. The board may be fissured or otherwise treated prior to passage into a heating chamber to activate the binder and dry the board. The board may also be fissured before drying when it is formed by trowelling or other method. In some instances the product is provided with perforations instead of fissures. This operation is effected on the dried board by the use of drills or punches, as many as 500 or more perforations being simultaneously formed in a 12" x 12" unit. The board may be provided with saw kerfs in its edges to receive the metal fastening units and splines.

The dried board coming out of the ovens usually contains 0–2% by weight water. If the board is stored under ambient conditions it may pick up additional moisture from the air. Cellulosic boards may on occasion contain as high as 8% by weight water, but 5% by weight is more generally found. Mineral wool or inorganic fiberboards generally contain a maximum of about 1½% by weight water. The dried board is generally sanded, but it need not be. It is this board, as it comes out of the drying ovens, that is to be treated with the dry formaldehyde gas in accordance with the present invention.

The dried board, containing no more than about 8% by weight water, and generally 1–5% by weight water, is to be treated with the dry formaldehyde gas. It is important to emphasize that the proper reaction does not take place if formaldehyde in water—formalin—is used as the reaction medium. The spraying of formalin onto the board under reactive conditions will not eliminate the sagging of the final product under high humidity conditions. Apparently the presence of such an excess of water interferes with the reaction between the formaldehyde and the amylaceous binder. A wet atmosphere should be avoided.

The most practical method for contacting the dry formaldehyde gas with the dried board is to place the board in a sealed chamber or autoclave, evacuate air, and admit the formaldehyde. The chamber may be large enough to contain large numbers of boards. The boards may be conveniently placed or stacked on a cart and wheeled into the enclosed vessel or atuoclave for treatment. The dry formaldehyde gas may be readily generated from paraformaldehyde. Such gas may contain up to 5-8% by weight water as impurity, but the drier the formaldehyde gas below these limits, the more efficient the reaction between the formaldehyde and the amylaceous binder. This reaction period is shortened by increasing the formaldehyde gas pressure above atmospheric pressure or by increasing the temperature, or both. The reaction will take place at room temperature and atmospheric pressure so long as the formaldehyde used up in the reaction is constantly replaced. Elevated temperatures up to about 350° F. may be used, with a preferred temperature range of 250°–300° F. being the best compromise between speed of reaction and convenience of heating. Elevated pressures up to 80 pounds per square inch absolute have been used successfully, but preferred pressures are in the range of about 35-60 pounds per square inch absolute. The process may be continuous if desired.

The boards, then, are charged to a suitable container which is sealed, evacuated, and filled to the requisite pressure with dry formaldehyde gas. The interior of the container is heated to the desired temperature. These conditions are maintained until the reaction between the formaldehyde and the amylaceous binder has gone substantially to completion. The end point of this reaction is readily identifiable by means of the iodine test for starch. This is a well-known test and consists of placing iodine solution in contact with starch and noting the characteristic deep purple color. The iodine test solution is described in the literature and is prepared by dissolving two grams of potassium iodine in 100 grams of water, followed by the addition, with stirring, of sufficient iodine crystals to produce a slight excess of undissolved iodine.

When the amylaceous binder has fully reacted with the dry formaldehyde gas in accordance with the present invention, the board containing the binder will no longer give the characteristic dark purple color of starch when tested with the iodine solution. Instead the color noted will be a dark yellow, easily distinguishable from the purple color seen in the presence of starch. The dark yellow color indicates that the starch is no longer present as such in the amylaceous binder. To the extent that unreacted starch is present in the amylaceous binder, to that extent the fiberboard will sag under high humidity conditions. It is only when all the starch has been reacted with the dry formaldehyde as shown by the iodine test that the board resists sagging under all conditions of high humidity that are reasonably encountered in the field. The formaldehyde gas penetrates the entire thickness of the boards and reacts with the amylaceous binder in the center of a stack of boards each of which may be 1½" thick. When the reaction between the formaldehyde and the amylaceous binder has ended, the autoclave or container may be evacuated and then flushed with air to remove unreacted formaldehyde. Care should be taken to avoid forming explosive mixtures of air and formaldehyde.

The reactivity of the dry formaldehyde gas, particularly when used at elevated temperatures, is such that the use of certain metals in the container or autoclave should be avoided. The autoclave ought not to be made of any alloy containing nickel, zinc, tin or magnesium. Thus stainless steel, brass, and bronze are excluded. Glass reactors are not suitable. Copper and aluminum are suitable metals but plain steel containers or autoclaves are preferred.

The following examples illustrate several embodiments of the invention. All parts are by weight unless otherwise stated.

EXAMPLE 1

A mineral wool fiberboard was prepared having the following ingredients.

| Ingredients: | Parts |
|---|---|
| Water | 6.08 |
| Scrap mineral wool fiberboard | 0.14 |
| WDB clay | 0.14 |
| Boric acid | 0.03 |
| Fungicide, pentachlorophenol | 0.01 |
| Paraffin wax size emulsion | 0.03 |
| Mineral wool | 1.54 |
| Starch | 0.63 |

The boric acid, the fungicide, and the scrap board were agitated in the water until they were completely dispersed. The starch and clay were then dispersed in the mixture. The mixture was warmed in a jacketed vessel to a temperature of 175°–180° F. to gel the starch, following which the wax size emulsion was added and briefly stirred into the mixture.

The gelled mixture was then transferred to a mixing vessel where the mineral wool was added and thoroughly mixed. The resulting mass was trowelled into a form measuring 13" x 13" x 1". After setting, the form was removed and the tile was dried in an oven maintained at 260° F. for 24 hours.

A series of specimens was taken from the board prepared as described above. One specimen was left untouched; this was the control. Another specimen was treated in an autoclave with pure dry formaldehyde gas at 325° F. for one and one-half hours. Another specimen was treated at 250° F. for eight hours. Another specimen was treated with formaldehyde and superheated steam (about a 1:1 weight mixture) for two hours at 325° F. All formaldehyde-treated specimens gave a negative result when tested for starch with iodine solution. The various specimens were identified as follows:

No. 1—dry formaldehyde, 325° F., 1½ hours
No. 2—dry formaldehyde, 250° F., 8 hours
No. 3—wet formaldehyde, 325° F., 2 hours
No. 4—untreated, control The various specimens were all subjected to duplicate sagging tests wherein specimens were supported at opposite edges, subjected to varying conditions of temperature and humidity, and the amount of sag halfway between the edges measured in thousandths of an inch. The following table shows the results:

*Table*

| Run No. | Sag, in Thousandth of Inches | | | | |
|---|---|---|---|---|---|
| | 85° F., 92% Relative Humidity | | | An Additional One Day at 115° F. | An Additional Two Days at Room Conditions |
| | 1 day | 2 days | 3 days | | |
| 1 | 0.005 | 0.009 | 0.009 | 0.000 | minus 0.001 |
| 2 | 0.003 | 0.002 | 0.004 | 0.009 | 0.007 |
| 3 | 0.008 | 0.062 | 0.066 | 0.098 | 0.095 |
| 4 | 0.013 | 0.036 | 0.043 | 0.042 | 0.042 |

EXAMPLE 2

Example 1 was repeated except that only 0.21 part of pearl starch was used in place of the 0.63 part of pearl starch listed in Example 1. Thus the Example 2 board contained 10% by weight starch binder as opposed to the 25% by weight starch binder of the board of Example 1.

The board was made, dried, and treated as in Example 1 in order to produce four specimens for the testing of sag resistance. The following table illustrates the results of these tests:

*Table*

| Run No. | Sag, in Thousandth of Inches | | | | |
|---|---|---|---|---|---|
| | 85° F., 92% Relative Humidity | | | An Additional One Day at 115° F. | An Additional Two Days at Room Conditions |
| | 1 day | 2 days | 3 days | | |
| 1 | 0.001 | 0.005 | 0.005 | 0.007 | 0.011 |
| 2 | 0.005 | 0.004 | 0.004 | 0.003 | 0.003 |
| 3 | 0.033 | 0.057 | 0.064 | 0.067 | 0.062 |
| 4 | 0.027 | 0.062 | 0.048 | 0.050 | 0.048 |

EXAMPLE 3

A wood fiberboard was made up having the following ingredients.

| Ingredients: | Parts |
|---|---|
| Paraffin wax size emulsion | 1.4 |
| Papermaker's alum | 1.0 |
| Wood fiber, 500 secs., Canadian 5-gram freeness | 2.4 |
| Wheat flour | 190.4 |
| Water | 13,300.00 |

The slurry was drained on a wire to form a board 1" thick. Specimens were cut from this board and treated in accordance with the specimens of Example 1. The formaldehyde-treated specimens did not give the characteristic purple test for starch when tested with iodine solution.

All specimens of the cut fiberboard were subjected to the identical sag tests described in Example 1. Following are the results:

*Table*

| Run No. | Sag, in Thousandth of Inches | | | | |
|---|---|---|---|---|---|
| | 85° F., 92% Relative Humidity | | | An Additional One Day at 115° F. | An Additional Two Days at Room Conditions |
| | 1 day | 2 days | 3 days | | |
| 1 | 0.035 | 0.039 | 0.041 | 0.025 | 0.025 |
| 2 | 0.033 | 0.052 | 0.053 | 0.043 | 0.044 |
| 3 | 0.063 | 0.062 | 0.067 | 0.065 | 0.060 |
| 4 | 0.074 | 0.083 | 0.085 | 0.074 | 0.073 |

I claim:
1. A method of rendering sag-resistant a fiberboard containing a gelled amylaceous binder which comprises treating said board with substantially dry formaldehyde gas until said binder in said board no longer gives the characteristic purple color on being tested with starch-indicating iodine solution.
2. A method according to claim 1 wherein the fibers in said fiberboard comprise mineral wool fibers.
3. A method according to claim 1 wherein said treating step is carried out at a temperature in the range of about 70°–350° F.
4. A method according to claim 3 wherein said temperature is in the range of about 250°–300° F.
5. A method according to claim 1 wherein said treating step is carried out at a pressure ranging from atmospheric pressure to about 80 pounds per square inch absolute.
6. A method according to claim 5 wherein said pressure is in the range of about 35–60 pounds per square inch absolute.
7. A sag-resistant fiberboard made according to the method of claim 1.

References Cited in the file of this patent

UNITED STATES PATENTS

| 1,701,763 | Prestholdt | Feb. 12, 1929 |
| 2,212,314 | Bauer | Aug. 20, 1940 |
| 2,773,764 | Park | Dec. 11, 1956 |
| 2,962,382 | Ives | Nov. 29, 1960 |

FOREIGN PATENTS

| 101,855 | Great Britain | Oct. 26, 1916 |